United States Patent [19]

Sagara

[11] Patent Number: 5,333,039
[45] Date of Patent: Jul. 26, 1994

[54] IMAGE FORMING APPARATUS WITH CONTROL FOR VARIABLY SETTING THE AMOUNT OF BLANK SPACE ON A RECORDING MEDIUM

[75] Inventor: Seiji Sagara, Kawasaki, Japan

[73] Assignee: Canon Kabushiki Kaisha, Tokyo, Japan

[21] Appl. No.: 979,060

[22] Filed: Nov. 19, 1992

[30] Foreign Application Priority Data

Nov. 25, 1991 [JP] Japan .................................. 3-334579

[51] Int. Cl.⁵ .............................................. G03G 21/00
[52] U.S. Cl. ................................. 355/218; 346/153.1; 346/160
[58] Field of Search ............... 355/208, 203, 204, 210, 355/218; 346/153.1, 157, 160; 358/300

[56] References Cited

U.S. PATENT DOCUMENTS

| | | | |
|---|---|---|---|
| 5,055,886 | 10/1991 | Nakatani et al. | 346/157 X |
| 5,072,260 | 12/1991 | Kimura | 355/218 |
| 5,099,283 | 3/1992 | Maruyama | 355/218 |
| 5,126,792 | 6/1992 | Iwata | 355/204 X |
| 5,140,348 | 8/1992 | Jamzadeh et al. | 355/218 X |

Primary Examiner—R. L. Moses
Attorney, Agent, or Firm—Fitzpatrick, Cella, Harper & Scinto

[57] ABSTRACT

An image forming apparatus includes a unit to form a visible image onto a photo sensitive drum on the basis of input image information, a copy transfer unit to transfer the developed visible image onto a recording paper, a fixing unit to fix the visible image transferred to the recording paper, and a control unit to variably set an amount of image blank which is formed onto the recording paper on the basis of the input image information.

5 Claims, 6 Drawing Sheets

FIG.6

ABCDEFGHIJKLMN
ABCDEFGHIJKLMN
ABCDEFGHIJKLMN
ABCDEFGHIJKLMN
ABCDEFGHIJKLMN
ABCDEFGHIJKLMN
ABCDEFGHIJKLMN
ABCDEFGHIJKLMN

FIG.7

ABCDEFGHIJKLMNOPQ
ABCDEFGHIJKLMNOPQ
ABCDEFGHIJKLMNOPQ
ABCDEFGHIJKLMNOPQ

ABCDEFGHIJKLMNOPQ
ABCDEFGHIJKLMNOPQ

IMAGE FORMING APPARATUS WITH CONTROL FOR VARIABLY SETTING THE AMOUNT OF BLANK SPACE ON A RECORDING MEDIUM

BACKGROUND OF THE INVENTION

1. Field of the Invention

The invention relates to an image forming apparatus for analyzing input image information and forming an image and, more particularly, to an image forming apparatus having fixing means for thermally fixing a toner image which has been transferred to a recording medium.

2. Related Background Art

Hitherto, in such kind of image forming apparatus, after a toner image formed on a photo sensitive material was transferred to a recording medium, an image is fixed on the recording medium by fixing means such as a fixing device comprising a thermal roller and a pressing roller and the recording medium is subsequently discharged.

In the image forming apparatus having such a fixing device, in order to avoid a fixing jam, an image margin of a predetermined amount, for example, about 5 mm from a front edge of the recording medium is forcedly set and the image is formed. Unless such an image blank is provided, in the case where, for instance, a toner image corresponding to an image which has fully been painted in black was transferred from the front edge of the recording medium, the recording medium after completion of the fixing of the image is wound around a fixing roller and some separating means such as a separating claw or the like is needed, causing the fixing device to increase in size. Therefore, it is the present situation that the technical problem is solved by forcedly setting the image blank as mentioned above.

FIGS. 6 to 8 are diagrams showing image patterns which are generated from such a kind of image forming apparatus. It is assumed that the upper portion in each of the diagrams coincides with the paper feeding direction.

FIG. 6 corresponds to an image output pattern having a blank (region in which no toner exists) of about 30 mm in each of the upper and lower portions of the paper and a blank of about 25 mm in each of the right and left portions. The image output pattern occupies most of a general document. Almost of a document, book, and other printed matter formed by a document forming apparatus also correspond to such a pattern.

FIG. 7 corresponds to an image output pattern in which information such as a character pattern fully exists up to a portion near the outer periphery of the paper. For example, FIG. 7 relates to the case where the telephone number of the transmitting side, the date of transmission, the number of pages transmitted, and the like are printed in the leading portion as in a facsimile image. Or, FIG. 7 relates to the case where a large amount of information is printed up to the edge of the paper as in a special application.

FIG. 8 corresponds to an image output pattern in which a black pattern exists in the front edge portion in the feeding direction of the paper. For example, FIG. 8 relates to the case where information near black exists in a leading portion of an image such as copy of a graphic pattern or color image including a photograph, a shadow of a peripheral portion occurring in the copying operation by a copying apparatus, or the like.

In case of the image information the content of which provides an image output pattern like shown in FIG. 6, no problem occurs, even when a blank of about 3 to 5 mm is uniformly formed in the front edge of the paper. In case of the image information the content of which provides an image output pattern like that shown in FIG. 7, it is necessary to minimize the blank space. Unless the image blank space is set to 2 mm or less, the image information will drop out. That is, for example, in the case where the image information to be generated exists up to the outer periphery of the paper as in case of the facsimile information, if the blank space is formed on the recording medium as mentioned above, important characters are not formed in the upper edge of the paper like an facsimile output paper or an image drops out so long as the upper edge of the facsimile output paper is set in accordance with the reference position of the original.

Further, in case of the image information which provides an image output pattern such as shown in FIG. 8, when there is used a fixing method of an electrophotograph using a heat roller whereby the toner image is melted by heat and pressure of the fixing device and is bonded onto the paper, the paper, just after the toner image was fixed, performs a motion such that it is wrapped around a fixing roller (not shown) by a melt bonding force of the toner. The paper releases from the fixing roller as a result of its rigidity as compared to the wrapping force. However, in the case where a black image exists in the leading portion of the paper, particularly, the wrapping force further increases and, in the worst case, the paper is not separated from the fixing roller and a wrapping jam occurs in the fixing roller.

If the image blank amount is set to a value less than 5 mm in order to avoid such a situation, there is a contradictory problem such that when a painted image exists in the edge portion of the original, a fixing jam such that the recording medium is wrapped around the fixing roller as mentioned above or the like occurs.

SUMMARY OF THE INVENTION

The invention is made to solve the above problems and it is an object of the invention to provide an image forming apparatus in which an image density of leading area information of image information to be generated is analyzed and an amount of blank space which is formed on a recording medium is controlled, so that even if the image blank amount is increased or decreased in accordance with the image information to be generated, an image with less drop-out of the image can be formed and discharged without causing a fixing jam.

According to the invention, to accomplish the above object, there is provided an image forming apparatus having control means for analyzing image density of image information that is transferred into a leading area in the feeding direction of a recording medium and for variably setting an amount of blank space which is formed on the recording medium.

The control means, on the other hand, converts the image information which is transferred into the leading area in the feeding direction of the recording medium into blank space of a predetermined amount in accordance with the analyzed image density of the image information and variably sets the image blank amount.

Further, the image forming apparatus of the invention has control means for analyzing the image density of the image information which is transferred into the leading area in the feeding direction of the recording medium and for variably setting a writing timing of a light image which is formed onto a photo sensitive material.

The control means delays the writing timing of a light image that is formed on the photo sensitive material in accordance with the analyzed image density of the image information and variably sets the blank space amount.

According to the invention, when the start of the recording is instructed, the control means analyzes the image density of the image information which is transferred into the leading area in the feeding direction of the recording medium and variably sets the amount of blank space which is formed on the recording medium, thereby enabling the recording medium to be discharged without causing the fixing jam even when the amount of blank space which is formed in the leading area in the feeding direction of the recording medium is minimized.

The control means converts the image information which is transferred into the leading area in the feeding direction of the recording medium into blank space of a predetermined amount in accordance with the analyzed image density of the image information and variably sets the blank space amount and processes the image information in which a possibility of the occurrence of the fixing jam is high, thereby enabling the image blank to be formed in the leading area in the feeding direction of the recording medium.

Further, when the start of the recording is instructed, the control means analyzes the image density of the image information which is transferred into the leading area in the feeding direction of the recording medium and variably sets the writing timing of the light image which is formed on the photo sensitive material, thereby enabling the recording medium to be discharged without causing a fixing jam, even when the amount of image blank which is formed in the leading area in the feeding direction of the recording medium is minimized.

The control means delays the writing timing of the light image which is formed on the photo sensitive material in accordance with the analyzed image density of the image information and variably sets the blank space amount and shifts the image information in which a possibility of the occurrence of the fixing jam is high, thereby enabling the blank space to be formed in the leading area in the feeding direction of the recording medium.

The above and other objects and features of the present invention will become apparent from the following detailed description and the appended claims with reference to the accompanying drawings.

BRIEF DESCRIPTION OF THE DRAWINGS

FIG. 6 is a diagram showing an image pattern which is generated from such a kind of image forming apparatus;

FIG. 7 is a diagram showing an image pattern which is generated from such a kind of image forming apparatus.

DETAILED DESCRIPTION OF THE PREFERRED EMBODIMENTS

Preferred embodiments of the invention will now be described hereinbelow with reference to the drawings.

Figure 1:
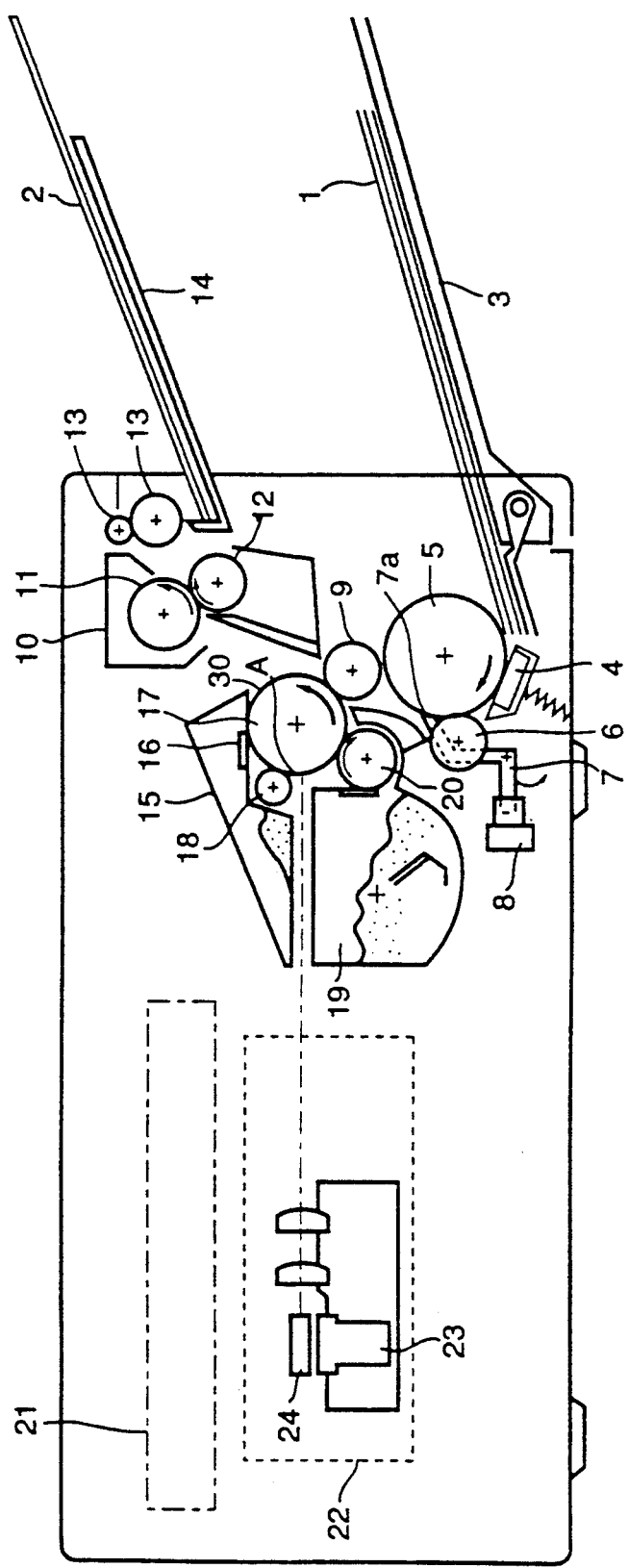
FIG. 1 is a cross sectional view for explaining a construction of an image forming apparatus showing an embodiment of the invention.

FIG. 1 is a cross sectional view for explaining a construction of an image forming apparatus showing an embodiment of the invention. In the diagram, reference numeral 21 denotes a controller for receiving image information which has been received on a page unit basis in accordance with a print signal from a computer (not shown) and controlling an image forming sequence of a printer engine. Reference numeral 1 denotes papers serving as recording media which are fed one sheet by one by a feed roller 5 and a separating pad 4. The feed roller 5 has a clutch (not shown) and starts its rotation by an instruction from the controller 21. Reference numeral 6 denotes a registration roller for conveying the fed paper toward a copy transferring step while matching the timings between the image leading which is formed on a photo sensitive drum 17 and the image leading of the paper 1. Reference numeral 7 denotes a paper edge detecting lever which can swing. The lever 7 is brought into engagement with a photo interrupter 8 and detects that the paper front edge reaches a predetermined position. Such detection is communicated to the controller 21.

A scanner unit 22 comprises a scanner motor 23, a polygon mirror 24, a plurality of lenses, and a laser diode (not shown). When the paper edge detecting lever 7 detects the front edge of the paper 1, the image writing operation by a laser beam is started toward an exposure point A on the photo sensitive drum 17 by an instruction of the controller 21. A processing cartridge 15 is integratedly constructed by various apparatuses, which will be explained hereinafter, for executing electrophotographic processes to form a toner image from a light image regarding an electrophotograph. Reference numeral 18 denotes a primary charging roller to uniformly charge the surface of the photo sensitive drum 17. When the drum 17 receives the laser beam (a set of dots) from the scanner unit 22, a developed image of the toner is formed in only a portion to which the laser beam has been irradiated by a developing sleeve 20 of a developing device 19. The toner image is transferred from the drum 17 onto the paper by a copy transfer roller 9. The paper is subsequently conveyed to the fixing process.

On the other hand, the remaining toner on the drum 17 is scraped off from the drum surface by a cleaner 16 after completion of the transfer process. The drum 17 with the clean surface is subsequently progressed toward the next charging process and the above operations are continuously executed. Reference numeral 10 denotes a roller fixing device comprising a fixing roller 11 having a heater (not shown) therein and a pressing roller 12. The paper onto which the toner image has electrostatically adsorbed by the transfer roller 9 passes through a portion between pair of rollers of the roller fixing device 10, thereby melting and fixing the toner particles onto the paper by the heat and pressure. After that, a paper 2 is led to a discharge roller 13 and is discharged and stacked onto a discharge tray 14.

The positioning (registration) of the image to the paper 1 according to the apparatus of the embodiment is controlled in the following manner.

A distance between a front edge 7a of the paper edge detecting lever 7 of the paper 1 and a copy transfer section 30 (pressure contact portion of the photo sensitive drum 17 and the transfer roller 9) is set to be equal to a distance between the laser writing position A on the photo sensitive drum 17 and the copy transfer section 30. Therefore, when the signal from the lever 7 is received, the controller 21 immediately starts the laser writing operation of the image data, so that the registration between the paper 1 and the image data can be easily and certainly performed.

In the image writing operation by the laser beam emitted from the scanner unit 22 constituting an optical scanning system in the embodiment, it is well known that an image is formed on the surface of the photo sensitive drum 17 as a set of light dots which are converged into a diameter of tens of μm. It will be understood from the above method that in case of image output patterns shown in FIGS. 6 and 7, a ratio of the laser dots constructing an image (ratio in case of the image exposure), namely, a toner ratio (dot ratio) lies within a range of about 5 to 7% and is set to 30% in case of the half tone (gray) and to 100% in case of a black pattern. Therefore, a dot ratio of the image data in a range from the upper edge in the paper feeding direction to 30 mm, for instance, is equal to 0% in case of FIG. 6 and to 5% in case of FIG. 7 and to 70 to 80% in case of FIG. 8. Accordingly, as will be explained hereinafter, before the controller 21 generates the image information, the above dot ratio is obtained by reference to the image data in the first 30 mm from the upper edge in the feeding direction. The blank space amount is variably set on the basis of the dot ratio obtained in accordance with the following flowchart, which will be explained hereinafter. Due to this, even when the blank space amount is increased or decreased in accordance with the image information which is generated, the image with less drop-out of the image can be formed and discharged without causing the fixing jam.

In the image forming apparatus constructed as mentioned above, when the start of the recording is instructed, the control means (controller 21 in the embodiment) analyzes the image density of the image information which is transferred into the front edge area in the feeding direction of the recording medium and variably sets an amount of blank space which is formed on the recording medium, thereby enabling the recording medium to be discharged without causing the fixing jam, even when the amount of blank space which is formed in the front edge area in the feeding direction of the recording medium is minimized.

The control means (controller 21 in the embodiment) converts the image information, which is transferred into the front edge area in the feeding direction of the recording medium, into the blank information of a predetermined amount in accordance with the analyzed image density of the image information and variably sets the blank space amount and processes the image information in which a possibility of the occurrence of the fixing jam is high, thereby enabling the blank space to be formed in the front edge area in the feeding direction of the recording medium.

Further, when the start of the recording is instructed, the control means (controller 21 in the embodiment) analyzes the image density of the image information which is transferred into the front edge area in the feeding direction of the recording medium and variably sets the writing timing of the light image which is formed on the photo sensitive material, thereby enabling the recording medium to be discharged without causing the fixing jam even when the amount of image blank which is formed in the front edge area in the feeding direction of the recording medium is minimized.

The control means (controller 21 in the embodiment) delays the writing timing of the light image which is formed on the photo sensitive material in accordance with the analyzed image density of the image information and variably sets the blank space amount and shifts the image information in which a possibility of the occurrence of the fixing jam is high, thereby enabling the image blank to be formed in the front edge area in the feeding direction of the recording medium.

Figure 2:
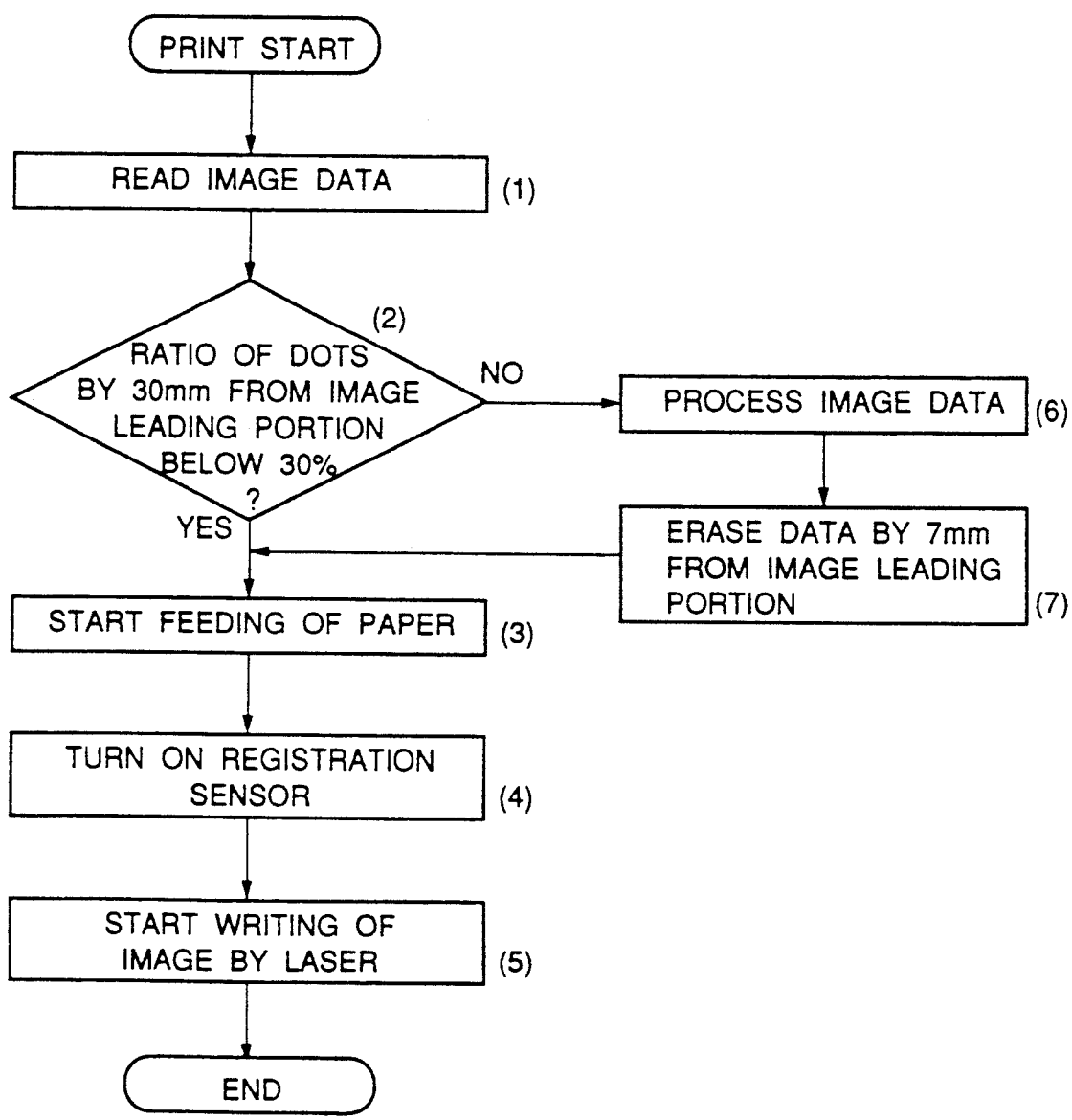
FIG. 2 is a flowchart showing an example of the first blank space amount setting control procedure in the image forming apparatus according to the embodiment of the invention.

FIG. 2 is a flowchart showing an example of the first blank space amount setting control procedure in the image forming apparatus showing an embodiment of the invention. Reference numerals (1) to (7) denote processing steps.

First, the controller 21 reads the image data (stored in a memory section not shown) to be generated (1) and obtains the dot ratio with reference to the image data by for the first 30 mm from the upper edge in the feeding direction and discriminates whether the value of the dot ratio is equal to or less than 30% (2). If YES, (in cases of the image output patterns shown in FIGS. 6 and 7) the feed roller 5 is driven at a timing for no blank space and the feeding operation of the paper 1 is started (3). Subsequently, when the photo interrupter 8 detects the front edge of the paper 1 which has been fed, namely, when the registration sensor is set to on (4), the laser image writing operation by the scanner unit 22 is started (5). The foregoing electrophotographic process is executed, the paper 2 having no blank space is discharged, and the processing routine is finished.

Figure 3:
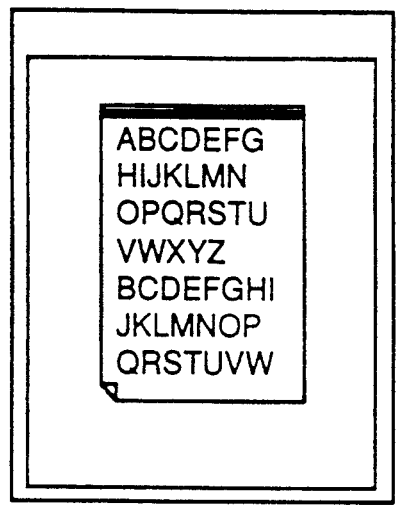
FIG. 3 is a diagram showing the first blank space formation output example in the image forming apparatus according to the invention.

On the other hand, when the dot ratio exceeds 30% with reference to the image data for the first by 30 mm from the upper edge in the feeding direction in the discrimination in step (2), the controller 21 processes the image data stored in the memory section (6). The image data in the image leading portion, for instance, by about 7 mm from the upper edge of the image is erased (7) and the processing routine is returned to step (3). Thus, the paper 2 formed with the blank space as shown in FIG. 3 is discharged. It will be obviously understood that the blank space amount can be set to a value other than 7 mm.

Figure 4:
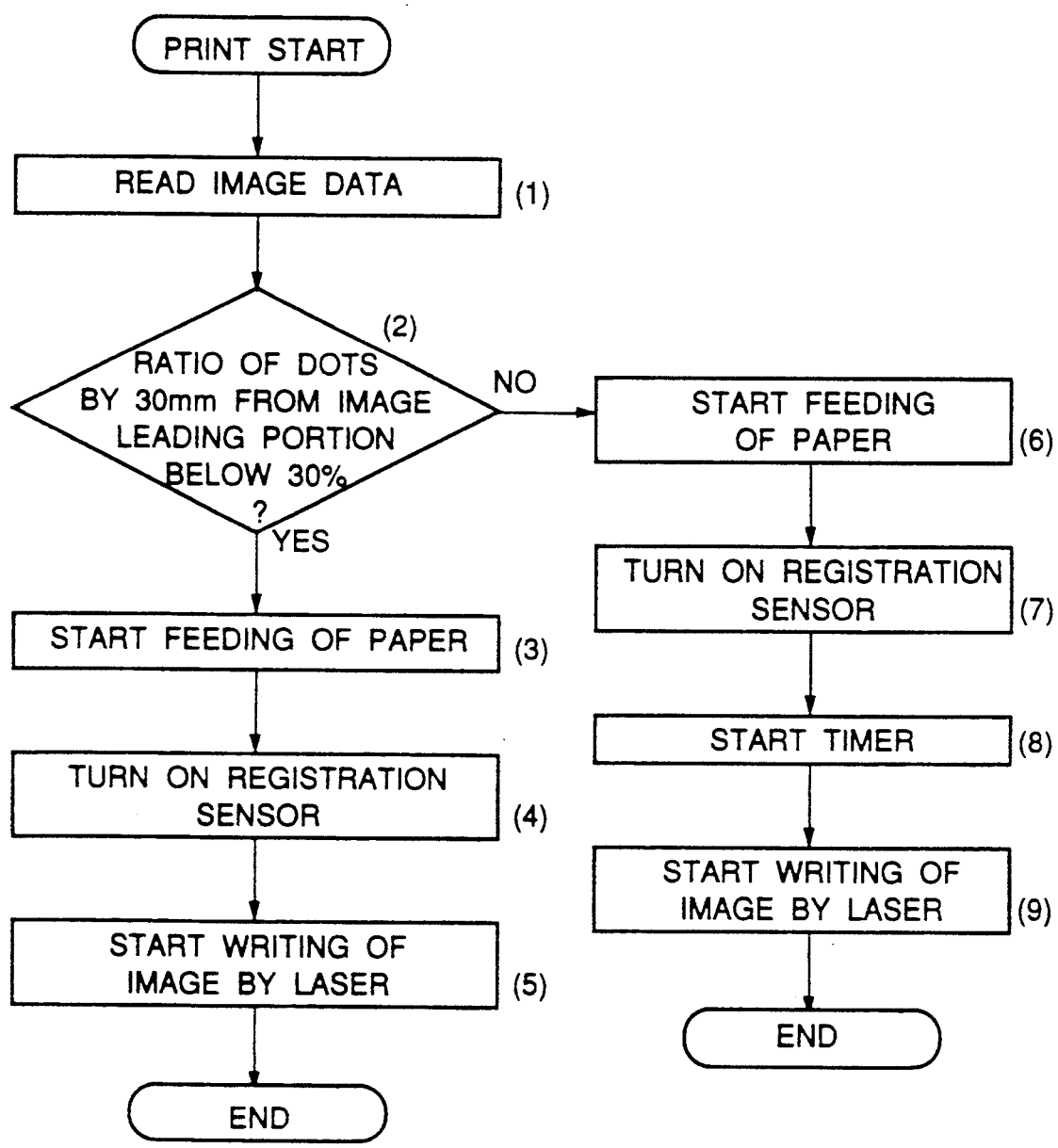
FIG. 4 is a flowchart showing an example of the second blank space amount setting control procedure in the image forming apparatus according to the embodiment of the invention.
Figure 8:
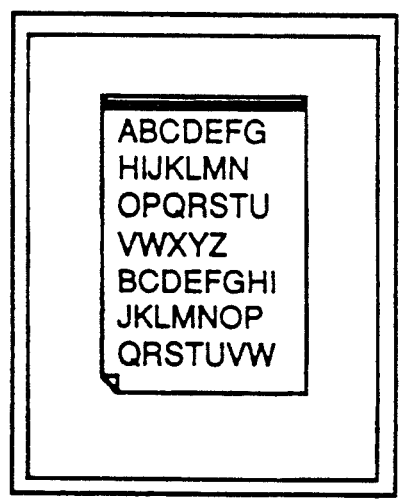
FIG. 8 is a diagram showing an image pattern which is generated from such a kind of image forming apparatus.

The above embodiment has been described with respect to the case where the image output pattern is as shown in FIG. 8 and the image data to be generated is processed and the blank space amount is variably set. As shown in FIG. 4, however, it is also possible to delay the laser image writing timing by the scanner unit 22 and to form a blank space on the paper.

FIG. 4 is a flowchart showing an example of the second image blank amount setting control procedure in the image forming apparatus according to an embodiment of the invention. Reference numerals (1) to (9) denote processing steps.

First, the controller 21 reads the image data (stored into a memory section not shown) to be generated (1) and obtains the dot ratio by referring to the image data for the first 30 mm from the upper edge in the feeding direction and discriminates whether the value of the dot ratio is equal to or less than 30% (2). If YES, (in cases of the image output patterns shown in FIGS. 6 and 7) the feed roller 5 is driven at a timing for no blank space and the feeding operation of the paper 1 is started (3). Subsequently, when the photo interrupter 8 detects the front edge of the paper 1 which has been fed, namely, when the registration sensor is set to on (4), the laser image writing operation by the scanner unit 22 is started (5) and the above electrophotographic process is executed and the paper 2 having no blank space is discharged. The processing routine is finished.

Figure 5:
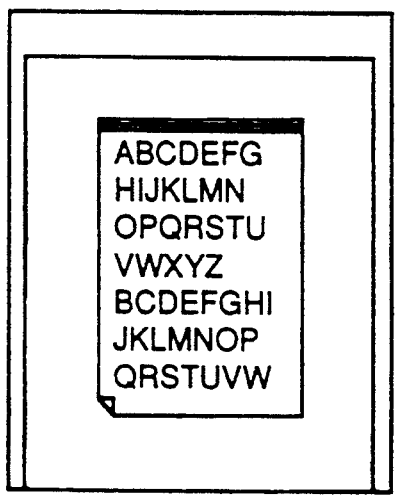
FIG. 5 is a diagram showing the third blank space formation output example in the image forming apparatus according to the invention.

On the other hand, in the discrimination in step (2), when the dot ratio exceeds 30% by referring to the image data for the first 30 mm from the upper edge in the feeding direction, the feeding operation of the paper 1 is started (6) in a manner similar to step (3). When the photo interrupter 8 detects the front edge of the paper 1 which has been fed, namely, when the registration sensor is set to on (7), the timer (time is determined on the basis of the feeding speed of the paper 1 and the blank space amount) provided in the controller 21 is started (8). When the timer times up, the laser image writing operation by the laser unit 21 is started (9). The above electrophotographic process is executed and the paper 2 having no image blank is discharged and the processing routine is finished. Thus, the paper 2 formed with the image blank as shown in FIG. 5 is discharged. Accurately speaking, although the registration of the paper 2 is deviated, no problem occurs in the actual use.

In the above embodiment, the sampling area of the image leading has been set to 30 mm. However, it can be also set to 10 mm or 50 mm in accordance with the mechanical characteristics of the apparatus. Although the embodiment has been described with respect to the case of discriminating the presence of absence of the formation of the blank space by using the dot ratio of 30% as a reference, an arbitrary value within a range from 20 to 50% can be also used as a reference for judgment in accordance with component construction of the toner or the print speed.

Further, although the embodiment has been described with respect to the case where the printer engine of the image forming apparatus is constructed by a laser beam printer, the invention can be also applied to an image forming apparatus to form an electrostatic latent image by another optical means such as LED printer, liquid crystal printer, or the like.

As described above, the invention has the control means for analyzing the image density of the image information which is transferred into the front edge area in the feeding direction of the recording medium and for variably setting the amount of blank space that is formed onto the recording medium. Therefore, even if the amount of blank space which is formed in the front edge area in the feeding direction of the recording medium is minimized, the recording medium can be discharged without causing the fixing jam.

The control means converts the image information which is transferred into the front edge area in the feeding direction of the recording medium into the blank information of a predetermined amount in accordance with the analyzed image density of the image information and variably sets the blank space amount. Therefore, the image information in which a possibility of the occurrence of the fixing jam is high is processed and the blank space can be formed in the front edge area in the feeding direction of the recording medium.

Further, the invention has the control means for analyzing the image density of the image information which is transferred into the front edge area in the feeding direction of the recording medium and for variably setting the writing timing of the light image which is formed onto the photo sensitive material. Therefore, even when the amount of blank space which is formed into the front edge area in the feeding direction of the recording medium is minimized, the recording medium can be discharged without causing the fixing jam.

The control means delays the writing timing of the light image which is formed onto the photo sensitive material in accordance with the analyzed image density of the image information and variably sets the image blank amount. Therefore, the image information in which a possibility of the occurrence of the fixing jam is high can be shifted and the blank space can be formed into the front edge area in the feeding direction of the recording medium.

Therefore, even when the blank space amount is increased or decreased in accordance with the image density of the image information to be generated, the image with less drop-out of the image can be formed and discharged without causing the fixing jam. There is an effect such that the image can be formed from the front edge of the recording medium without a drop-out of the image, or the like.

What is claimed is:

1. An image forming apparatus comprising:
   means for forming a visible image onto an image holding material on the basis of input image information;
   means for transferring the developed visible image onto a recording medium;
   means for fixing the visible image transferred onto the recording medium;
   means for specifying a density of the visible image in accordance with the input image information; and
   control means for variably setting an amount of blank space to be left on said recording medium, said amount of blank space being set in accordance with the density specified by said specifying means.

2. An apparatus according to claim 1, wherein said control means converts the image information in a front edge area in a feeding direction of the recording medium into blank space information and variably sets the blank space amount.

3. An apparatus according to claim 1, wherein said image forming means has been for modulating a laser beam on the basis of the input image information and means for developing a latent image formed on the image holding material by the irradiation of said laser beam,
   and said control means variably sets a timing to start the irradiation of the laser beam onto said image holding material on the basis of the image information corresponding to the front edge area in the feeding direction of the recording medium.

4. An apparatus according to claim 3, wherein said control means delays the timing to start the irradiation in accordance with an image density of the image information in the front edge area and variably sets the blank space amount.

5. An apparatus according to claim 1, wherein said specifying means specifies a density of a front edge area in the visible image in accordance with the input image information.

* * * * *

UNITED STATES PATENT AND TRADEMARK OFFICE
CERTIFICATE OF CORRECTION

PATENT NO. : 5,333,039
DATED : July 26, 1994
INVENTOR(S) : SEIJI SUGARA

It is certified that error appears in the above-indentified patent and that said Letters Patent is hereby corrected as shown below:

Column 2,
line 8, "image" should be deleted;
line 15, "an" should read --a--;
line 20, "FIG. 8" should read --FIG. 8,--; and
line 21, ",when" should read --when--.

Column 5,
line 3, "has" should read --has been--;
line 5, "between" should read --between the--; and
line 25, "22" should read --22,--.

Column 6,
line 34, "by" should be deleted; and
line 49, "by" should be deleted.

Column 7,
line 40, "of" (second occurrence) should read --or--.

Signed and Sealed this

Twentieth Day of December, 1994

Attest:

BRUCE LEHMAN

Attesting Officer          Commissioner of Patents and Trademarks